United States Patent

[11] 3,622,510

| [72] | Inventors | Vincent F. Felicetta;<br>Robert O. Peacock, both of Bellingham, Wash. |
|---|---|---|
| [21] | Appl. No. | 759,206 |
| [22] | Filed | Sept. 11, 1968 |
| [45] | Patented | Nov. 23, 1971 |
| [73] | Assignee | Georgia Pacific Corporation<br>Portland, Oreg. |

[54] RECOVERY OF PROTEINACEOUS MATERIAL FROM WASTE EFFLUENTS
10 Claims, No Drawings

[52] U.S. Cl. .................................................. 210/54,
99/2, 260/112, 260/124
[51] Int. Cl. .......................................................... C02c 5/02
[50] Field of Search .......................................... 210/52–54;
260/112, 124; 99/2

[56] References Cited
UNITED STATES PATENTS

| 2,838,483 | 6/1958 | Jantzen .......................... | 260/124 R |
| 3,314,880 | 4/1967 | Rubin ............................ | 210/44 |
| 3,390,999 | 7/1968 | Jantzen .......................... | 99/2 |

*Primary Examiner*—Michael Rogers
*Attorney*—Peter P. Chevis

ABSTRACT: The recovery of proteinaceous material from aqueous plant effluents by treating the effluent with a low molecular weight lignosulfonate.

RECOVERY OF PROTEINACEOUS MATERIAL FROM WASTE EFFLUENTS

This invention pertains to the recovery of proteinaceous material from plant effluents by precipitating the proteinaceous material with a low molecular weight lignosulfonate.

A considerable amount of protein values is lost in aqueous effluents discharge from, for example, food processing plants. Not only is there a loss of valuable products, these effluents contribute significantly to the pollution problem. Often, the processing plants are operated seasonally for relatively short periods of time, but when in operation large volumes of low concentration effluents are produced which cannot be adequately handled by the local sewage or waste disposal plants. For example, in fish processing plants, large quantities of water are used not only in washing and cleaning the fish but in the continual washing and cleaning of the plant facilities including the floors and general work area. The effluent stream will include flume water, the wastes obtained from the fish itself, such as blood, slime, and other fish wastes, as well as particles of fish and other wastes obtained from the plant washings. Large volumes of waste are generated and it is not uncommon for even a relatively small plant to be faced with the disposal of over several hundred thousand gallons of waste per day.

In addition to the large volume, many of the effluents do not lend themselves to treatments requiring storage or a time lapse in processing. The effluents are highly putrescible and the holding of the effluent for several hours during the normal warm summer weather may result in sufficient putrefacation to generate offensive odors which cannot be tolerated even in sparsely populated areas.

Flocculation methods commonly used in the food industry for recovery of solids prior to discharge or further treatment of the effluent are not entirely satisfactory for many of the processing wastes. These wastes often contain soluble as well as insoluble proteins which are difficult to separate. The usual flocculating agents, such as alum, ferric chloride and others are only partially effective as they do not remove the soluble proteins. Generally, the amount of protein values removed by such treatment is not sufficient to alleviate the disposal problems encountered with many effluents.

It is known that lignin and lignosulfonate will combine with proteins. The recovery of proteins from waste streams by treatment of the stream with lignin has been suggested, for example, in U.S. Letters Pat. Nos. 2,200,784 and 2,547,425. These processes are basically directed to the use of lignins, such as an alkali lignin, where the insolubility of the lignin under acid conditions can be utilized in the flocculation. It has also been suggested that lignosulfonates may be used. However, upon treatment with a lignosulfonate, a protein-lignosulfonate floc is obtained which is voluminous and difficult to settle or dewater by accepted means, especially the floc obtained with soluble protein. Heating will coagulate the floc, but the low concentration of protein in many of the plant effluents and the large volume of effluent which would have to be thus handled makes this method of dewatering costly and impractical.

It is, therefore, an object of this invention to provide an improved process for the recovery of proteinaceous material from aqueous effluents characterized by a relatively fast settling protein-lignosulfonate floc or precipitate. A further object is to provide an improved method for treating aqueous processing effluents to facilitate the disposal of the waste effluents with a minimum of pollution. A still further object is to recover the proteinaceous material in a useful form for animal feeds and for other applications.

The above and other objects are attained, according to this invention, by treating the effluent with a low molecular weight lignosulfonate. By treating the effluent with a low molecular weight lignosulfonate, a relatively fast settling floc is obtained. The floc may be recovered from the effluent by settling to concentrate the floc thus simplifying its separation or recovery.

The low molecular weight lignosulfonate or sulfonated lignin may be obtained from lignin-containing materials sulfonated by the various known methods. Lignin is a polymeric substance of substituted aromatics found in plant and vegetable tissue associated with cellulose and other plant constituents. Thus, vegetable and plant tissues are lignin-containing materials which are the principal sources of lignin.

One of the main sources for sulfonated lignins or lignosulfonates is the residual pulping liquors from the pulp and paper industry where a lignocellulosic material such as wood, straw, corn stalks, bagasse, and the like is processed to separate the cellulose or pulp from the lignin. In the sulfite pulping process, the lignocellulosic material is digested with a sulfite or bisulfite to obtain a sulfonated residual pulping liquor commonly referred to as "spent sulfite liquor" wherein the sulfonated lignin is dissolved. In other processes, the residual pulping liquor as obtained from the process may not be a sulfonated product. However, the residual liquors or products containing the lignin portion of the lignocellulosic material from other processes and also from the sulfite process may be treated by the various known methods to sulfonate the lignin to the different degrees desired.

The sulfonated product of the sulfite pulping process or obtained by sulfonation of other residual pulping liquors or lignin-containing materials generally contains constituents besides sulfonated lignin or lignosulfonate. Usually the sulfonated residual pulping liquor solids will contain from about 55 to 75 percent of lignosulfonates with the remainder consisting of other products. For example, spent sulfite liquor solids may contain from 20 to 35 weight percent of carbohydrates or sugars and other organic compounds of a lower molecular weight than lignosulfonates. In addition to the sugars, the liquors may contain carbohydrate degradation products as well as various inorganic salts.

The lower molecular weight lignosulfonates used in the process are lignosulfonates having a diffusion coefficient in the range of 10 to 22 mm.$^2$/day (as determined by the agar gel method as described in J. Am. Chem. Soc. Vol. 81, 2054 (1959) by J. Moacanin et al.) with the product being mostly free of the high molecular weight lignosulfonates having a diffusion coefficient less than 7 mm.$^2$/day. The above diffusion coefficients represent estimated weight average molecular weights of about 16,000, 2,000, and 40,000 respectively. The low molecular weight lignosulfonates are usually obtained by fractionation of a sulfonated residual pulping liquor to remove the high molecular weight lignosulfonates and obtain a fraction having, preferably, a diffusion coefficient in the range of 12.5 to 17 mm.$^2$/day. The lignosulfonates, which are the higher molecular weight constituents of the liquor, are present in varying molecular weights from the molecular weight of the sulfonated dimers or trimers of guaiacylpropane-type type units, commonly believed to be common to the monomers of lignin, to molecular weights in the hundred thousands or such that the product is just soluble. Lime precipitation, dialysis, electrodialysis, and extractive fractionation with a solvent, such as ketone or alcohol, are illustrative examples of methods by which the low molecular weight lignosulfonates may be separated from the other constituents. Often in fractionation, the carbohydrates and other nonligneous constituents may be obtained in the low molecular weight lignosulfonate fraction. While these nonligneous constituents do not have to be removed, it is generally desirable to remove, at least partially, some of the nonligneous constituents. If not removed, larger amounts of the product have to be added to obtain equivalent amounts of lignosulfonates. Also, many of these constituents do not precipitate with the proteinaceous material but remain in the effluent stream. The removal of these low molecular weight constituents may be effected before or after the removal of the high molecular weight constituents. For example, a spent sulfite liquor may be fermented to convert the carbohydrates to yeast or alcohol and removed from the liquor prior to fractionation.

A low molecular weight lignosulfonate may also be obtained by subjecting a product containing high molecular weight lignosulfonates to treatments known to reduce the molecular weight of lignosulfonates, such as treatments with a strong alkali, sulfonation, oxidation with nitric acid, hydrogen peroxide, and other oxidants. After such treatment, it may still be desirable to fractionate the product to remove the nonligneous low molecular weight organic constituents and degradation products.

The preferred low molecular weight lignosulfonate is an intermediate fraction, for example, a sulfonated residual pulping liquor where the liquor is fractionated to remove most of the high molecular weight lignosulfonates having a molecular weight above 16,000 or a diffusion coefficient less than about 10 mm.$^2$/day and the low molecular weight constituents having a molecular weight less than about 2,000 or a diffusion coefficient greater than about 22 mm.$^2$/day. While the molecular weight of the lignosulfonates found in spent sulfite liquor will vary somewhat from different liquors, an effective intermediate fraction may be generally obtained, for example, by fractionating a spent sulfite liquor, to remove the highest molecular weight constituents in an amount of from 25 to 45 weight percent of the spent sulfite liquor solids and from 20 to 40 weight percent of the solids of the lowest molecular weight constituents. The 20 to 40 percent low molecular weight constituent fraction will include mainly the carbohydrate and other low molecular weight organic compounds which may have a molecular weight less than about 2,000.

The proteinaceous materials are precipitated by the low molecular weight lignosulfonates upon contacting the effluent with the low molecular weight lignosulfonate at a pH below the isoelectric point of the proteins in the effluent. While the isoelectric point may vary for different proteinaceous materials, generally the lignosulfonate is contacted with the effluent at a pH in the range of 3.0 to 4.8, preferably 3.8 to 4.2. If the effluent is at a higher pH, it is acidified to the degree desired before or after the lignosulfonate addition. Most of the proteins have an isoelectric point above 4.8 and thus are precipitated by the lignosulfonate at a lower pH. A pH below 3.0 is operative but generally is not used due to increased acid consumption and the increase in the corrosiveness of the effluent at the lower pH.

Only a relatively small amount of lignosulfonate is necessary to effectively precipitate the proteinaceous material. For example, an appreciable portion of the proteinaceous material may be recovered upon the addition of about 5 weight percent of the lignosulfonate, based upon the protein content in the effluent. Generally, the amount used is in the range of from 10 to 40 weight percent, preferably in the range of from 15 to 25 weight percent, based upon the protein content. With the lignosulfonate quantities in the preferred range, generally over 90 percent of the protein may be thus recovered. Amounts of lignosulfonate up to about 50 or even 100 percent of the protein content or more may also be used. Additional protein may be precipitated with larger amounts, but the amount of constituents added which dissolve and remain in the effluent stream also increases. There is generally a small amount of lignosulfonate which may not precipitate but remains dissolved in the effluent in addition to the sugars and other nonligneous constituents present in the lignosulfonate fraction. Larger amounts of lignosulfonate appear to be associated or combined with the protein when larger quantities of the lignosulfonate are used. Thus, additions of an excess of lignosulfonate over that required to substantially precipitate all of the lignin may not result in all of the excess lignosulfonate dissolving in the effluent, but a major portion of the excess lignin may become somehow associated with the proteinaceous material and be precipitated to give a product containing a higher proportion of lignosulfonate.

Illustrative examples of plant effluents containing proteinaceous material which may be recovered with the low molecular weight lignosulfonates are fish processing wastes including stickwater, dairy effluents such as whey, slaughterhouse effluents and the grain and vegetable processing effluents such as grain mashes and the like.

The concentration of the proteinaceous materials in the effluents is generally relatively low so that the amount of lignosulfonate added is in the range of 100 to 1,000 parts per million. While the major portion of the solids in many effluents may be proteinaceous material, the effluents may also contain oils and other organic materials as well as inorganic salts. The content of the solids in an effluent is usually not uniform and may vary widely depending upon the operation undertaken in the plant at that particular time. Some variation in the proteinaceous material may also be obtained; however, generally the waste will contain various proteins and other nitrogenous compounds such as polypeptides, nucleoproteins and B vitamins which are recoverable.

The lignosulfonate products as generally obtained are salts of the metal used as the base in pulping, such as calcium, sodium, ammonium, and magnesium. The products may be used as such but can also be converted to the acid form or to salts of other metals prior to use. For example, if the recovered protein is to be used in feed, the lignosulfonate product may be used in part as a salt of trace metals.

The following examples further illustrate the invention.

Example I

A fermented calcium base liquor was fractionated by intermixing a concentrated solution of spent sulfite liquor with ethyl alcohol. A light phase in an amount of about 39 weight percent of the fermented spent sulfite liquor solids and a heavy phase containing the remainder of the solids was obtained. The light phase containing the low molecular weight constituents was discarded and the heavy phase was further fractionated by contacting the phase with an alcohol-water solution to obtain a second light phase. The light phase was removed and the remaining heavy phase was further contacted with an additional alcohol-water solution of a lower alcohol content. The process was repeated until the original heavy phase obtained was fractionated into four fractions. These four fractions were used for the recovery of proteinaceous material from a fish processing plant effluent.

An effluent obtained from the processing of perch, cod and red snapper was diluted with water to obtain an effluent having a concentration of 2,500 parts by weight of solids per million parts of effluent. The diluted effluent was then treated with about 12.5 percent by weight of lignosulfonate, based upon the solids content of the effluent stream, which represented about 19 percent based upon the protein content. The pH was adjusted by the addition of an acid to 4.0 to 4.2. The mixture was immediately placed in a 1,000 milliliter graduate and mixed by inverting the cylinder five times. The precipitate, obtained upon the addition of the lignosulfonate, was then permitted to settle. The rate of settling of the precipitate was determined by periodically observing the amount of clear supernatant liquor obtained above the sludge or precipitate prior to obtaining hindered settling or the decrease in the rate of settling due to compaction. The effects of compaction were generally noted after the sludge had settled from 50 to 60 percent of the total height of the graduated cylinders.

The diffusion coefficients of the particular fractions, settling rates obtained, and the amount of supernatant liquor obtained after 45 minutes of settling, expressed as percent over the total height, are given in the following table:

| Fraction | Diffusion Coefficient mm.$^2$/day | Settling Rate, Inches Per Hour | Clear Phase, % of Total Height in Cylinder |
|---|---|---|---|
| 1 | 5.0 | 19 | 53 |
| 2 | 5.8 | 23 | 68 |
| 3 | 8.1 | 27 | 74 |
| 4 | 12.7 | 38 | 88 |

EXAMPLE II

Lignosulfonate fractions having different molecular weights were obtained by selective precipitation of purified lignosulfonates from ethyl alcohol. The purified lignosulfonates were obtained from a fermented calcium base spent sulfite liquor by precipitating the lignosulfonates from the liquor with an amine. The precipitated amine lignosulfonate salt was then reacted with sodium hydroxide to convert the amine lignosulfonate to sodium lignosulfonate. By the amine precipitation, the lignosulfonates in the liquor were separated from the carbohydrates and other nonligneous constituents generally present in a spent sulfite liquor.

The sodium lignosulfonate thus obtained was fractionated by incremental additions of ethyl alcohol to a 32 percent by weight aqueous solution of the sodium lignosulfonates. The alcohol was added in three increments. Upon the addition of the first increment, the highest molecular weight lignosulfonates precipitated out and were separated from the solution phase. The solution phase thus obtained was then further contacted with an additional amount of ethyl alcohol which resulted in precipitating out the highest molecular weight lignosulfonates remaining in the solution. The remaining solution after a second incremental alcohol addition, was then further contacted with additional amounts of alcohol. In this manner the sodium lignosulfonate was fractionated in four fractions.

The fractions of the lignosulfonates obtained were then used in the precipitation and recovery of protein from the effluent of a fish plant processing ocean perch. The effluent was diluted with water until it contained 2,500 parts of solids per million parts of effluent and then treated with the lignosulfonate at a pH of 4.0 to 4.2. The lignosulfonates were added in an amount of about 14 weight percent of the solids content and about 21.5 percent of the protein content. The treated effluent was placed in a 1,000 milliliter graduate and the settling rates determined in a manner similar to that described above. The results obtained and other details are given in the table below:

| Fraction | Amount of fraction, percent of total purified lignosulfonate | Diffusion coefficient, mm.²/day at 25° C. | Settling rate, inches per hour | Clear phase, percent of total height in cylinder |
|---|---|---|---|---|
| 1 | 37.2 | 4.9 | 15 | 56 |
| 2 | 9.5 | 6.3 | 14 | 53 |
| 3 | 17.8 | 7.5 | 19 | 66 |
| 4 | 35.5 | 13.4 | 43 | 80 |

In a manner similar to that described above, a fermented calcium base spent sulfite liquor was fractionated into two fractions by the use of alcohol without removing the carbohydrates and other low molecular weight constituents. The settling rate was determined as described above for the two fractions. The results obtained and other details are given below:

| Fraction | Amount of fraction, percent of the fermented spent sulfite liquor | Diffusion coefficient, mm.²/day at 25° C. | Settling rate, inches per hour | Clear phase, percent of total height in cylinder |
|---|---|---|---|---|
| 1 | 74 | 7.8 | 25 | 75 |
| 2 | 26 | 20.2 | 44 | 82 |

A dilute fermented calcium base spent sulfite liquor was treated for 2 hours at 100° C. with nitric acid in an amount of about 78 percent based upon the liquor solids. By the treatment, the diffusion coefficient of the spent sulfite liquor was increased from 11.7 to 19.8 mm.²/day. The settling rate obtained with this product was 41 inches per hour and in about 45 minutes approximately 86 percent or 860 milliliters of clear supernatant liquor was obtained in the 1,000 milliliter graduated cylinder.

To illustrate the amount of proteinaceous material recovered from the waste by the four fractions of the purified sodium lignosulfonate above, a waste obtained from the processing of the ocean perch containing about 9,740 parts of solids by weight per million parts of effluent were treated with the four fractions of the purified lignosulfonate at a pH of 4.0 to 4.2 and the treated effluent centrifuged to separate the protein lignosulfonate precipitate. Each of the lignosulfonate fractions was tested at three levels of addition. On the basis of nitrogen analysis, it was estimated that 65 percent of the solids in the effluent were proteinaceous materials. The addition levels and percent of the protein removed are given in the table below:

| Fraction | Diffusion Coefficient, mm.²/day 025° C. | Amount Added, % of Waste Solids | % of Protein Removed |
|---|---|---|---|
| 1 | 4.9 | 7.2 | 82 |
|   |     | 9.4 | 83 |
|   |     | 11.8 | 86 |
| 2 | 6.3 | 7.6 | 88 |
|   |     | 9.9 | 86 |
|   |     | 12.6 | 91 |
| 3 | 7.5 | 7.5 | 80 |
|   |     | 9.8 | 86 |
|   |     | 12.4 | 89 |
| 4 | 13.4 | 7.5 | 82 |
|   |     | 9.8 | 85 |
|   |     | 12.4 | 94 |

What is claimed is:

1. A process for the recovery of proteinaceous material from an aqueous plant effluent which comprises treating the effluent with a low molecular weight lignosulfonate fraction at a pH below the isoelectric point of the proteinaceous materials to obtain a lignosulfonate-protein floc, said low molecular weight lignosulfonate fraction being substantially free of lignosulfonates having a diffusion coefficient less than 7 mm.²/day and having an average molecular weight such that the diffusion coefficient of the fraction is in the range of from 10 to 22 mm.²/day, and settling the floc to separate it from the treated effluent.

2. A process according to claim 1 wherein the low molecular weight lignosulfonate fraction has a diffusion coefficient in the range of 12.5 to 17 mm.²/day.

3. A process for the recovery of proteinaceous material from an aqueous plant effluent which comprises treating the effluent with a low molecular weight lignosulfonate fraction at a pH below the isoelectric point of the proteinaceous materials, said low molecular weight lignosulfonate fraction being the fraction of a sulfonated residual pulping liquor having a diffusion coefficient of from 10 to 22 mm.²/day and from which the high molecular weight constituents having a diffusion coefficient of less than 7 mm.²/day have been removed.

4. A process according to claim 3 wherein the residual pulping liquor is a spent sulfite liquor.

5. A process according to claim 4 wherein the effluent is a fish processing plant effluent.

6. A process according to claim 5 wherein the lowest molecular weight constituents of the spent sulfite liquor having a diffusion coefficient of greater than 22 mm.²/day have been removed.

7. A process for the recovery of proteinaceous material from an aqueous plant effluent which comprises treating the effluent with a low molecular weight lignosulfonate at a pH below the isoelectric point of the proteinaceous material, said low molecular weight lignosulfonate fraction having a diffusion coefficient in the range of from 12.5 to 17 mm.²/day and being a spent sulfite liquor from which substantially all of the high molecular weight lignosulfonates having a diffusion coefficient less than 10 mm.²/day have been removed.

8. A process according to claim 7 wherein substantially all of the low molecular weight constituents having a diffusion coefficient greater than 22 mm.$^2$/day have been removed from said low molecular lignosulfonate fraction.

9. A process according to claim 7 wherein the effluent is a fish processing plant effluent and the pH is in the range of 3.0 to 4.8.

10. A process according to claim 8 wherein the effluent is a fish processing plant effluent and the pH is in the range of 3.8 to 4.2.